Patented Sept. 9, 1952

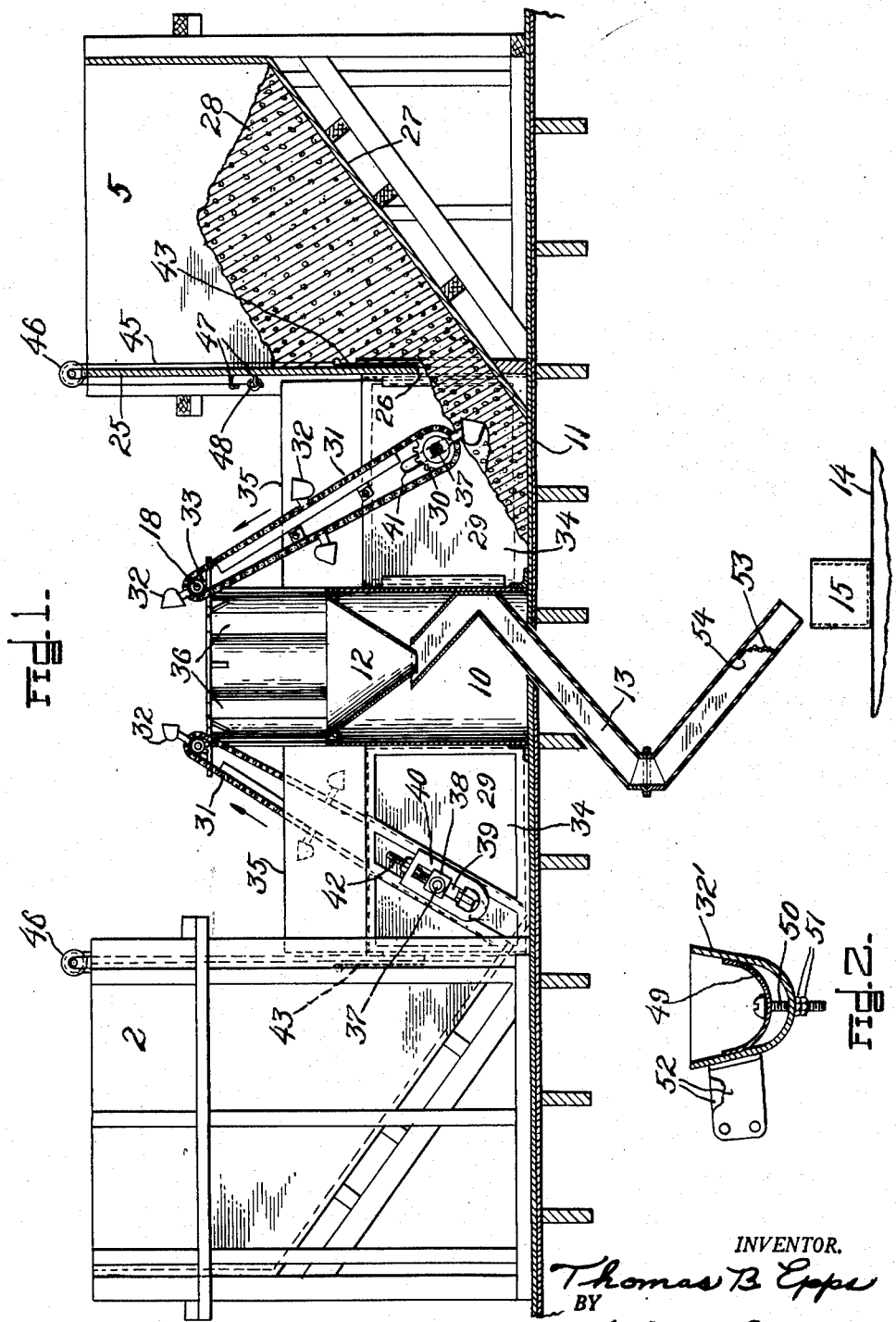

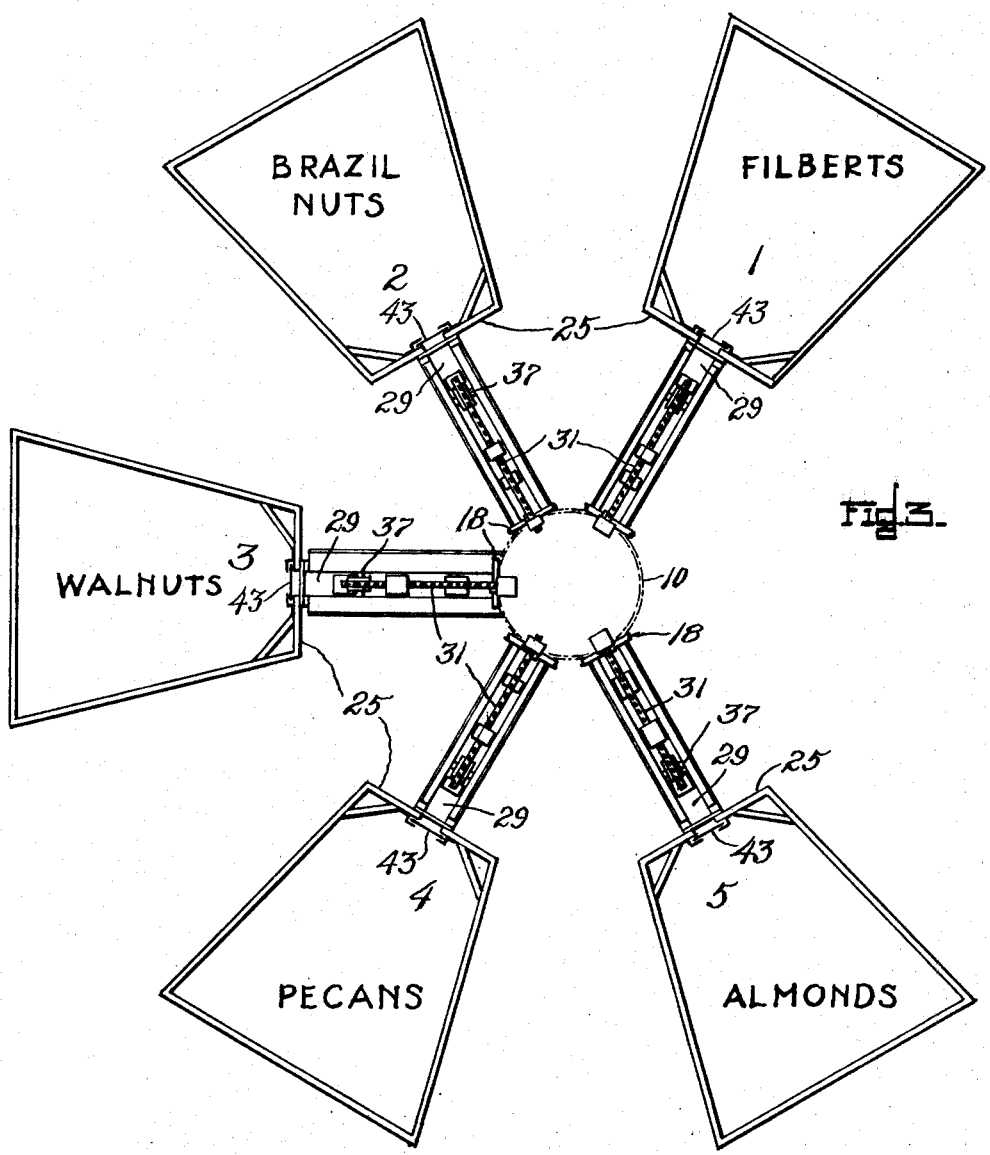

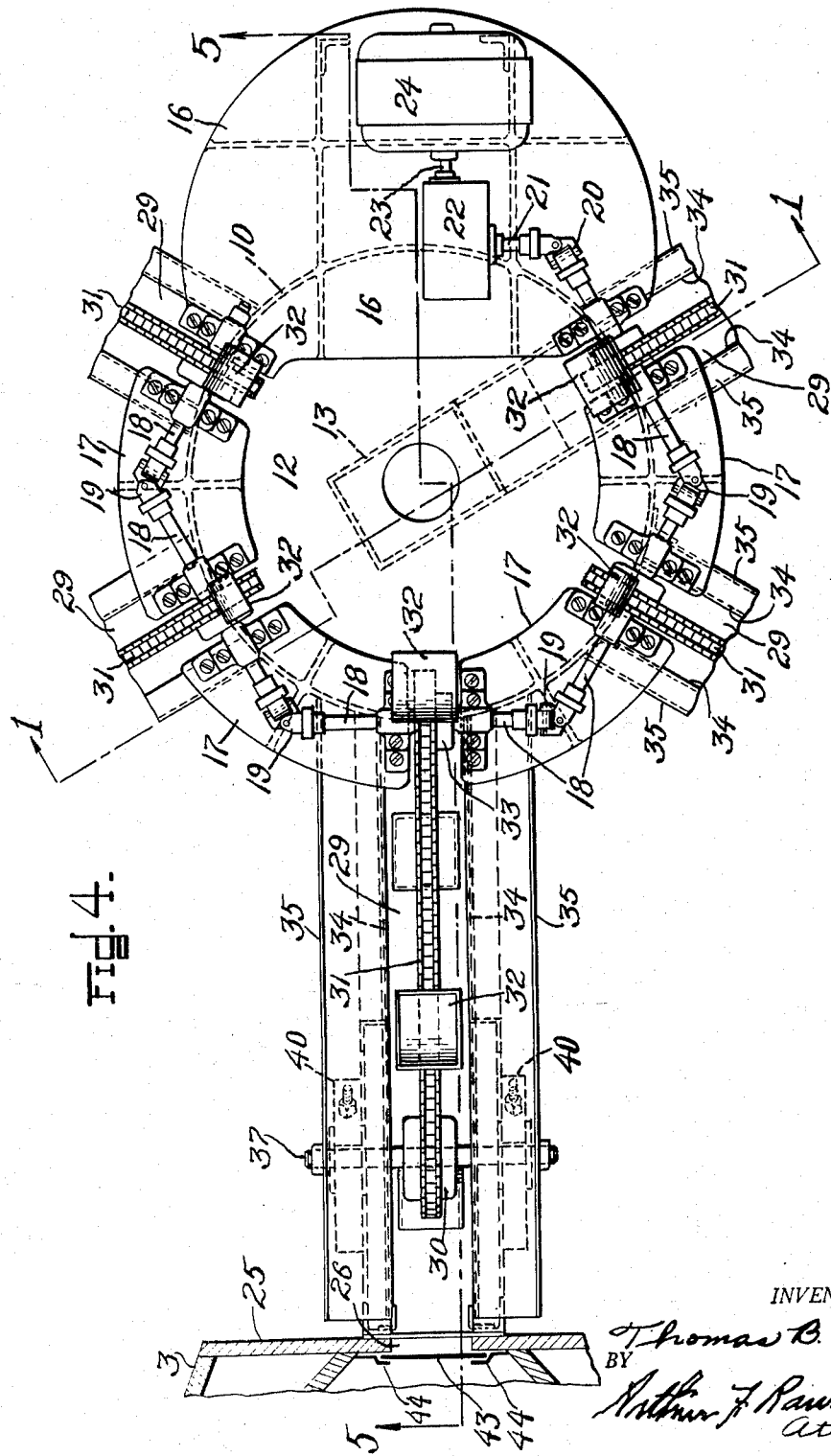

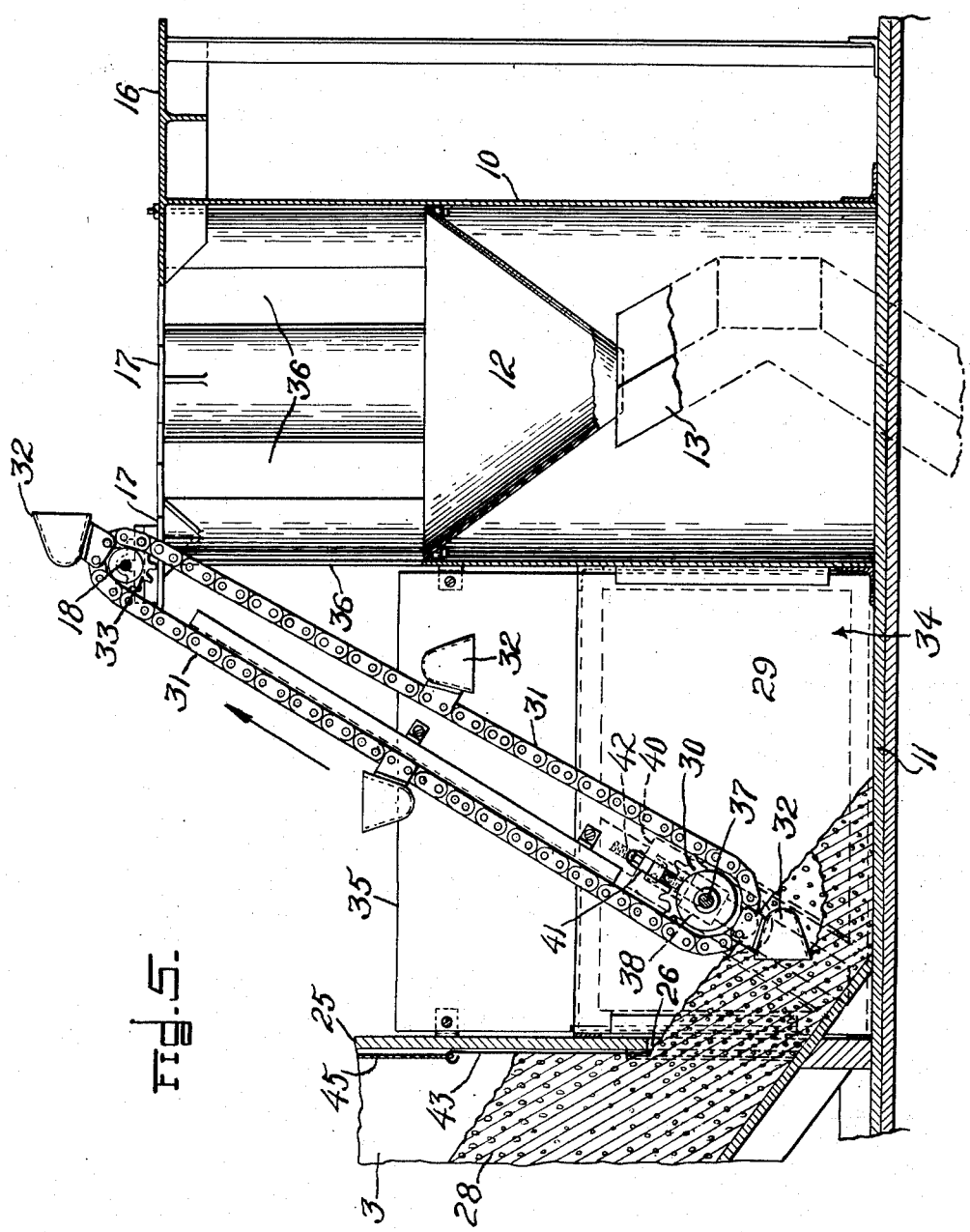

2,609,969

UNITED STATES PATENT OFFICE 2,609,969

APPARATUS FOR COMBINING MATERIALS

Thomas B. Epps, Boston, Mass.

Application September 24, 1947, Serial No. 775,943

8 Claims. (Cl. 222—135)

This invention relates to apparatus for combining measured amounts of two or more different kinds or species of materials into a unitary batch or mixture of predetermined volume and/or weight, and for delivering each unitary batch or mixture at a predetermined destination for packaging or otherwise, the primary object of the invention being to provide an apparatus of the character described which will be of efficient and comparatively simple construction and which will be automatically operable to expeditiously and successively assemble and intermittently deliver measured batches of said different kinds of materials at said destination.

It is also an important object of the invention to provide an apparatus of the character described which will be particularly adapted for use in separately and automatically packaging individual measured batches of assorted nuts.

To these ends I have provided an apparatus of the character described which, in the preferred embodiment of the invention, comprises a plurality of bins each holding a species of material that is different from the material of the other bin or bins. Associated with each bin is a conveyor that is operated to intermittently transfer measured amounts of material from its bin into one end of a material-mixing delivery chute by which the material from all of the conveyors is directed, while under the influence of gravity, to a common destination as a measured batch composed of a plurality of different kinds or species of material, with each of the latter bearing a definite predetermined relation as to volume and/or weight to the volume and/or weight of the measured batch.

Other features of the invention are hereinafter pointed out or will hereinafter appear.

In the accompanying drawings:

Figure 1 shows, partly in elevation and partly in section, an apparatus constructed and operating in accordance with this invention, said view approximating a section on line 1—1 of Fig. 4.

Figure 2 is a sectional detail of one of the measuring buckets hereinafter described.

Figure 3 is a top plan view of the hoppers and conveyors of the apparatus shown in Fig. 1.

Figure 4 is a top plan view, on larger scale, of the apparatus shown in Fig. 1, portions of the hoppers and of some of the conveyors being omitted.

Figure 5 is a section on line 5—5 of Fig. 4.

The illustrated embodiment of this invention is particularly designed for use in packaging individual batches of mixed nuts in units of one pound each, each unit comprising, for example, walnuts, almonds, filberts, pecans and brazil nuts in approximately the following proportions:

| | | |
|---|---|---|
| Walnuts | 32 percent or | 26.24 cu. in. |
| Almonds | 24 percent or | 20.40 cu. in. |
| Filberts | 24 percent or | 13.68 cu. in. |
| Pecans | 10 percent or | 5.70 cu. in. |
| Brazil nuts | 10 percent or | 5.30 cu. in. |

These particular ingredients, percentages and cubic inches are merely recited as exemplifying one desirable composite mixture unit of nuts weighing one pound which the hereinafter described machine is capable of producing, but it is to be understood that the invention is not limited with respect to the material operated upon, the proportions of the ingredients or the size of the composite batch that is the product of the apparatus.

Referring to the drawings, 10 represents an upright cylindrical stand seated upon and secured to a floor or fixed support 11. Within stand 10, and intermediate the opposite ends of the latter, is fixed a conical receiving funnel 12 whose lower end is disposed within the upper end of a conduit 13 that is also fixedly attached to stand 10, said conduit being of zigzag form and extending downwardly through an opening in floor 11 to a point adjacent to a support 14 on which is supported a suitable container or carton 15 into which material is delivered by gravity from conduit 13.

At its upper end the stand 10 is provided with a circular series of horizontally disposed and angularly spaced-apart segmental plates 16 and 17 (Figs. 1, 4 and 5) provided upon their top sides with bearings rotatably supporting a series of shaft sections 18 that are connected end to end by universal joints 19. The shaft section 18 at one end of this series is connected by a universal joint 20 (Fig. 4) with a shaft 21 that is connected through a speed-reducing mechanism 22 with the armature shaft 23 of a driving motor 24, said mechanism and said motor being fixed in positions upon the top of the segmental plate 16. It will thus be seen that when motor 24 is operating all of the shaft sections 18 are driven in the same direction and at one speed.

Grouped around the stand 10 in spaced-apart relationship are a plurality of bins 1, 2, 3, 4 and 5 (Fig. 3) each of which is constructed with a front wall 25 facing stand 10 and provided adjacent to its lower end with an outlet opening 26 (Figs. 1 and 5). A bottom wall 27 is provided for each bin which slants downwardly from the rear wall of the bin toward, and projects through, the outlet opening 26. Each bin 5 is loaded with a body of nuts 28 which body, being substantially fluid, gravitates to and through the outlet opening 26 as shown in Figs. 1 and 5. Thus the lower portion of the body of nuts 28 extends through the outlet opening 26 into a gutter 29 within which is arranged a sprocket wheel 30 that is in engagement with an endless conveyor chain 31 carrying a plurality of measuring buckets 32. Each conveyor chain 31 extends obliquely upwardly from its sprocket 30 to and around a sprocket 33 fast on one of the shaft sections 18, viz., the shaft section 18 that is immediately above the gutter 29 that is occupied by the chain.

Each gutter 29 is constructed with a pair of oppositely disposed vertical side walls 34 (Fig. 4) which extend from its bin to the stand 10 and at its top each side wall 34 is made with an outwardly inclined top marginal portion 35, said top marginal portions serving to catch and direct back into the gutter any overflow from the buckets as they travel upwardly.

The spaces between the segments constituting the top of the stand 10, together with slots 36 (Figs. 1 and 5) formed longitudinally in the upper portion of the cylindrical base of the stand, provide passageways for chains 31 and the buckets 32.

Each lower sprocket 30 is rotatably supported by a short shaft 37 which extends through slots formed in the oppositely disposed side walls 34 of its gutter and is mounted adjacent to its opposite ends in slides 38 (Fig. 1) adjustably mounted in slots 39 provided in brackets 40 fixedly secured to said side walls. One of the slots formed in the side walls of the gutter is shown at 41 in Fig. 1 and one of the slots 39, referred to, is also shown in said figure. Each bracket 40 is made at one end thereof with a tapped hole within which is mounted an adjustable abutment screw 42 which bears at its lower end against the proximate block 38 and by means of these screws the conveyor chain 31 is maintained taut.

The effective capacity of the outlet opening 26 of each bin is determined by the position of an adjustable shutter or gate 43 (Figs. 1 and 4) that is mounted at its opposite sides in vertical ways 44 provided upon the inner side of the front wall 25 of each bin. The upper end of each shutter or gate 43 has connected to it one end of a flexible cable 45 which extends upwardly over a sheave 46 and thence downwardly outside of front wall 25 to a hook 47 with which the opposite end of said cable is separably connected by means of an eye 48 provided at that end of said cable. A series of hooks 47 may be provided from the front wall 25 so that by transferring the eye 48 from one hook to another the shutter or gate 43 may be adjusted vertically to increase or diminish the size of the outlet opening of the bin according to the characteristics of the nuts contained within the latter.

When the apparatus is utilized to deliver one pound mixture units, each composed of the five kinds of nuts referred to above, the bin 1 (Fig. 3) may be loaded with filbert nuts and the buckets 32 of the conveyor associated with that bin will each have a capacity of 13.68 cubic inches; the bin 2 will be loaded with brazil nuts and the buckets 32 of the conveyor associated with that bin will each have a capacity of 5.30 cubic inches; the bin 3 will be loaded with walnuts and the buckets 32 of the conveyor associated with that bin will each have a capacity of 26.24 cubic inches; the bin 4 will be loaded with pecan nuts and the buckets 32 of the conveyor associated with said bin will each have a capacity of 5.70 cubic inches, and the bin 5 will be loaded with almonds and the buckets 32 of the conveyor associated with that bin will each have a capacity of 20.40 cubic inches.

All of the conveyor chains 31 are of one and the same length, the distance between shafts 18 and 37, center to center, is about forty-two inches and four buckets are provided upon each chain. Since all of these conveyors are driven from one and the same articulated shaft made up of the sections 18, said conveyor chains all travel at the same speed.

As each bucket travels downwardly with its chain and swings around the lower sprocket 30 it is carried through the nuts within the gutter of that chain and is thereby filled with nuts. Continued movement of the conveyor chain carries the filled bucket upwardly, as indicated by the arrows, and as the bucket swings around and over the upper sprocket 33 its contents is dumped into the funnel 12 by which it is directed into conduit 13.

It is a feature of the illustrated embodiment of the invention that buckets on all of the conveyor chains 31 are dumped simultaneously into funnel 12 which, together with the descent of the nuts through the zigzag conduit 13, thoroughly mixes the different kinds of nuts and delivers each one pound batch into a carton or other container 15 (Fig. 1). That is to say, a plurality of bucket loads of different kinds of nuts are simultaneously discharged into funnel 12 by the conveyors 31 and thoroughly intermixed. To accomplish this the conveyor chains are all made of the same length; they are all equipped with the same number of buckets similarly spaced-apart; they are all driven at the same speed and are timed so that bucket loads are delivered intermittently by all of them simultaneously, or approximately so.

Figure 2 illustrates a type of bucket that is particularly constructed for adjustment of the capacity thereof to accord with the physical characteristics of the kind of nut to be handled thereby. In this case the bucket 32' is provided interiorly with a false bottom member 49 consisting of a piece of thin spring sheet metal having an aperture at its middle that is occupied by a screw 50 which also extends through an aperture at the bottom of bucket 32' to the exterior of the latter where it is provided with a pair of nuts 51 by means of which it is held and locked in adjusted position. Adjustment of screw 50 by means of the nuts 51 adjusts the sheet metal member 49 toward or from the mouth of the bucket thereby to vary the capacity of the bucket as desired, and after such adjustment the nuts 51 are again tightened to secure the member 49 in its adjusted position. At one side thereof the bucket body 32' is provided with a pair of apertured arms 52 which are separably incorporated as links in the conveyor chains and the buckets 32 are similarly connected with their chains.

It will be understood that during the interval between the delivery of nuts the filled carton 15 (Fig. 1) is removed and an empty carton 15 substituted. It will also be apparent that the funnel 12 and conduit 13 constitute a delivery chute by which the nuts are thoroughly intermixed as they descend the same.

Adjacent to the lower end of the conduit 13 the latter is provided upon its interior with a flexible fabric curtain 53 by which the speed of the descending nuts is reduced immediately before said nuts are discharged into the carton 15. This curtain 53 may consist of a section of fabric that is fastened at 54 to the upper side of conduit 13 so that said curtain normally hangs by gravity across the interior of the conduit but is free to be shifted aside by the descending nuts.

What is claimed is:

1. An apparatus for combining measured amounts of a plurality of different kinds of materials in predetermined proportions to successively produce individual measured batches of mixed materials each of a predetermined size, said apparatus comprising a plurality of bins each holding a supply of one kind only of said materials and each provided adjacent to its bottom and at one side thereof with an outlet through which the material of the bin is fed by gravity into a gutter leading from said outlet; a separate conveyor adjacent to each bin having a lower end portion co-operatively disposed in proximity to the material within said gutter, and each of said conveyors being equipped with measuring buckets to pick up material from said gutter when said conveyor is actuated thereby to intermittently feed measured amounts of said material upwardly to an upper end portion of said conveyor; a single material mixing delivery chute into an upper end of which all of said conveyors discharge their bucket-measured amounts of material to combine the latter and cause the same to descend said mixing chute under the influence of gravity, and means for operating said conveyors, the inlet end of each chute being above the level of its bin outlets and said gutters.

2. An apparatus of the character described according to claim 1 wherein means is provided adjacent to the lower end of said chute for supporting a container in position to receive each measured batch as it is discharged from said chute thereby to separately package said measured batches.

3. An apparatus of the character described according to claim 1, wherein each of said conveyors comprises an endless sprocket-supported chain to which said measuring buckets are connected by which the material is transferred from the said gutter to said chute.

4. An apparatus of the character described according to claim 1 wherein each of said conveyors is an endless sprocket-supported chain equipped with measuring buckets by which the material is transferred from the said gutter to said chute, and wherein the buckets of all of said chains are equidistantly and correspondingly disposed in spaced-apart relationship upon their chains.

5. An apparatus of the character described constructed in accordance with claim 1 wherein said conveyors consist of endless sprocket-supported chains disposed radially around said chute, and wherein said conveyor-operating means include an articulated chain-operating shaft composed of shaft sections connected by universal joints and equipped with sprockets by which said conveyor chains are driven, and means connected with one end of said articulated shaft for driving the same.

6. An apparatus for packaging measured batches of mixed nuts, said apparatus comprising a plurality of bins each holding a supply of nuts of one kind exclusively, each of said bins being made with a bottom wall which slants downwardly to an outlet at one side of the bin through which the nuts descend by gravity into a gutter extension of said bin; a separate endless flexible conveyor extending into said gutter and equipped with a plurality of measuring buckets at spaced-apart intervals thereon, said conveyor extending upwardly from within said gutter to and around a conveyor-supporting shaft provided with means for engaging and actuating said conveyor when said shaft is rotated thereby to cause said buckets to scoop nuts from within said gutter and carry the same upwardly to said shaft where the nuts are dumped from each bucket as it passes around said shaft; a chute into the upper end of which buckets of all of the conveyors dump their loads of nuts approximately simultaneously, means for supporting an open container in position to receive the mixed nuts discharged from the lower end of said chute, and means for operating said conveyors.

7. An apparatus according to claim 6 wherein buckets of all of the conveyors periodically and simultaneously dump their loads into said chute.

8. An apparatus according to claim 6 and wherein a gate is provided for said outlet that is manually adjustable to vary the effective capacity of said outlet.

THOMAS B. EPPS.

REFERENCES CITED

The following references are of record in the file of this patent:

UNITED STATES PATENTS

| Number | Name | Date |
|---|---|---|
| Re. 5,977 | Welham | July 21, 1874 |
| 232,537 | Morton | Sept. 21, 1880 |
| 258,237 | Maher | May 23, 1882 |
| 304,615 | Church | Sept. 2, 1884 |
| 675,815 | Clark | June 4, 1901 |
| 750,949 | Darrow et al. | Feb. 2, 1904 |
| 795,349 | Gledhill | July 25, 1905 |
| 874,037 | Schreiber | Dec. 17, 1907 |
| 1,424,904 | Heindl | Aug. 8, 1922 |
| 1,438,189 | Perdue et al. | Dec. 12, 1922 |
| 1,750,244 | Robb | Mar. 11, 1930 |
| 1,880,287 | Sifton | Oct. 4, 1932 |
| 1,942,745 | Coats | Jan. 9, 1934 |